(12) United States Patent
Hatke

(10) Patent No.: US 10,407,103 B2
(45) Date of Patent: Sep. 10, 2019

(54) MOUNTING BRACKET FOR A TRUCK BODY AND METHOD FOR MOUNTING A COMPOSITE TRUCK BODY TO A CHASSIS

(71) Applicant: Wabash National, L.P., Lafayette, IN (US)

(72) Inventor: Dennis G. Hatke, Lafayette, IN (US)

(73) Assignee: Wabash National, L.P., Lafayette, IN (US)

( * ) Notice: Subject to any disclaimer, the term of this patent is extended or adjusted under 35 U.S.C. 154(b) by 52 days.

(21) Appl. No.: 15/867,227

(22) Filed: Jan. 10, 2018

(65) Prior Publication Data

US 2018/0194405 A1 Jul. 12, 2018

Related U.S. Application Data

(60) Provisional application No. 62/444,981, filed on Jan. 11, 2017.

(51) Int. Cl.
*B62D 24/02* (2006.01)
*B62D 25/20* (2006.01)
(Continued)

(52) U.S. Cl.
CPC ......... *B62D 24/02* (2013.01); *B62D 25/2054* (2013.01); *B62D 65/02* (2013.01);
(Continued)

(58) Field of Classification Search
CPC .... B62D 21/09; B62D 24/02; B62D 25/2054; B62D 27/06; B62D 27/065; B62D 27/02;
(Continued)

(56) References Cited

U.S. PATENT DOCUMENTS 2,883,232 A * 4/1959 Olley ................... B60G 99/004
280/792
3,557,992 A 1/1971 Reeves
(Continued)

FOREIGN PATENT DOCUMENTS

AU        713260      11/1999
CA      1329818       5/1994
(Continued)

OTHER PUBLICATIONS

Black Sara "Structural adhesives Part I: Industrial" CompositesWorld posted Apr. 11, 2016 7 pages.
(Continued)

*Primary Examiner* — Gregory A Blankenship
(74) *Attorney, Agent, or Firm* — Faegre Baker Daniels LLP

(57) ABSTRACT

A mounting bracket configured to mount a composite truck body to a chassis is provided. The mounting bracket includes a first side plate having a first hole therethrough and configured to be coupled to a first side of a main beam of the composite truck body and a second side plate having a second hole therethrough and configured to be coupled to a second, opposite side of the main beam and aligned opposite the first side plate. The mounting bracket also includes a tube configured to be routed through the first hole of the first side plate, a main beam hole of the main beam, and the second hole of the second side plate, and a bar configured to be routed through the tube. The bar includes a vertical hole through each end, and each vertical hole is configured to receive a mounting rod.

20 Claims, 12 Drawing Sheets

(51) Int. Cl.
*B62D 27/06* (2006.01)
*B62D 33/077* (2006.01)
*B62D 33/04* (2006.01)
*B62D 65/02* (2006.01)

(52) U.S. Cl.
CPC .............. *B62D 27/06* (2013.01); *B62D 33/04* (2013.01); *B62D 33/077* (2013.01)

(58) Field of Classification Search
CPC ...... B62D 33/04; B62D 33/077; B62D 33/02; B62D 65/02
See application file for complete search history.

(56) References Cited

U.S. PATENT DOCUMENTS

| | | | |
|---|---|---|---|
| 3,637,252 A | | 1/1972 | Metsker |
| 3,910,624 A | * | 10/1975 | Becker ................. B62D 27/065 410/81 |
| 4,239,276 A | * | 12/1980 | Bertolini ............ B62D 25/2054 105/422 |
| 4,418,507 A | | 12/1983 | Roberts et al. |
| 4,685,720 A | | 8/1987 | Oren |
| 4,758,299 A | | 7/1988 | Burke |
| 4,976,490 A | | 12/1990 | Gentle |
| 5,403,063 A | | 4/1995 | Sjostedt et al. |
| 5,429,066 A | | 7/1995 | Lewit et al. |
| 5,507,405 A | | 4/1996 | Thomas |
| 5,562,981 A | | 10/1996 | Ehrlich |
| 5,664,518 A | | 9/1997 | Lewit et al. |
| 5,700,118 A | | 12/1997 | Bennett |
| 5,765,639 A | | 6/1998 | Muth |
| 5,772,276 A | | 6/1998 | Fetz et al. |
| 5,800,749 A | | 9/1998 | Lewit et al. |
| 5,802,984 A | | 9/1998 | Thoman |
| 5,830,308 A | | 11/1998 | Reichard |
| 5,860,668 A | | 1/1999 | Hull et al. |
| 5,860,693 A | | 1/1999 | Ehrlich |
| 5,890,435 A | | 4/1999 | Thoman |
| 5,897,818 A | | 4/1999 | Lewit et al. |
| 5,908,591 A | | 6/1999 | Lewit et al. |
| 5,916,093 A | | 6/1999 | Fecko |
| 5,979,684 A | | 11/1999 | Ohnishi |
| 5,992,117 A | | 11/1999 | Schmidt |
| 6,004,492 A | | 12/1999 | Lewit et al. |
| 6,013,213 A | | 1/2000 | Lewit et al. |
| 6,076,693 A | | 6/2000 | Reiter |
| 6,082,810 A | | 7/2000 | Bennett |
| 6,092,472 A | | 7/2000 | Thoman |
| 6,199,939 B1 | | 3/2001 | Ehrlich |
| 6,206,669 B1 | | 3/2001 | Lewit et al. |
| 6,220,651 B1 | | 4/2001 | Ehrlich |
| 6,227,125 B1 | | 5/2001 | Schroeder |
| 6,247,747 B1 | | 6/2001 | Kawanomoto |
| 6,318,794 B1 | | 11/2001 | Berube |
| 6,349,988 B1 | | 2/2002 | Foster |
| 6,374,546 B1 | | 4/2002 | Fecko |
| 6,496,190 B1 | | 12/2002 | Driemeyher et al. |
| 6,497,190 B1 | | 12/2002 | Lewit |
| 6,505,883 B1 | | 1/2003 | Ehrlich |
| 6,543,469 B2 | | 4/2003 | Lewit et al. |
| 6,615,741 B2 | | 9/2003 | Fecko |
| 6,626,622 B2 | | 9/2003 | Zubko |
| 6,688,835 B1 | | 2/2004 | Buher |
| 6,723,273 B2 | | 4/2004 | Johnson et al. |
| 6,740,381 B2 | | 5/2004 | Day et al. |
| 6,745,470 B2 | | 6/2004 | Foster et al. |
| 6,755,998 B1 | | 6/2004 | Reichard et al. |
| 6,761,840 B2 | | 7/2004 | Fecko |
| 6,824,341 B2 | | 11/2004 | Ehrlich |
| 6,843,525 B2 | | 1/2005 | Preisler |
| 6,854,791 B1 | | 2/2005 | Jaggi |
| 6,863,339 B2 | | 3/2005 | Bohm |
| 6,869,561 B2 | | 3/2005 | Johnson et al. |
| 6,877,940 B2 | | 4/2005 | Nelson |
| 6,893,075 B2 | | 5/2005 | Fenton et al. |
| 6,911,252 B2 | | 6/2005 | Lewit et al. |
| 6,986,546 B2 | | 1/2006 | Ehrlich |
| 7,000,978 B1 | | 2/2006 | Messano |
| 7,025,166 B2 | | 4/2006 | Thomas |
| 7,025,408 B2 | | 4/2006 | Jones et al. |
| 7,069,702 B2 | | 7/2006 | Ehrlich |
| 7,134,820 B2 | | 11/2006 | Ehrlich |
| 7,182,396 B2 | | 2/2007 | Taylor |
| 7,219,952 B2 | | 5/2007 | Taylor |
| 7,264,305 B2 | | 9/2007 | Kuriakose |
| 7,353,960 B2 | | 4/2008 | Seiter |
| 7,407,216 B2 | | 8/2008 | Taylor |
| 7,434,520 B2 | | 10/2008 | Zupancich |
| 7,451,995 B2 | | 11/2008 | Bloodworth et al. |
| 7,461,888 B2 | | 12/2008 | Brown |
| 7,517,005 B2 | | 4/2009 | Kuriakose |
| 7,575,264 B1 | | 8/2009 | Solomon |
| 7,578,534 B2 | | 8/2009 | Wuerfel, III |
| 7,578,541 B2 | | 8/2009 | Layfield |
| 7,587,984 B2 | | 9/2009 | Zupancich |
| 7,588,286 B2 | | 9/2009 | Lewallen |
| 7,594,474 B2 | | 9/2009 | Zupancich |
| 7,608,313 B2 | | 10/2009 | Solomon |
| 7,621,589 B1 | | 11/2009 | Gerome |
| 7,704,026 B2 | | 4/2010 | Roush |
| 7,722,112 B2 | | 5/2010 | Ehrlich |
| 7,748,172 B2 | | 7/2010 | Zupancich |
| 7,762,618 B2 | | 7/2010 | Lewallen |
| 7,790,076 B2 | | 9/2010 | Seiter |
| 7,829,165 B2 | | 11/2010 | Grandominico et al. |
| 7,887,120 B2 | | 2/2011 | Boivin |
| 7,901,537 B2 | | 3/2011 | Jones |
| 7,905,072 B2 | | 3/2011 | Verhaeghe |
| 7,914,034 B2 | | 3/2011 | Roush |
| 7,931,328 B2 | | 4/2011 | Lewallen |
| 8,016,322 B2 | | 9/2011 | Keehan |
| 8,056,960 B2 | | 11/2011 | Brown |
| 8,186,747 B2 | | 5/2012 | Bloodworth et al. |
| 8,263,217 B2 | | 9/2012 | Verhaeghe |
| 8,342,588 B2 | | 1/2013 | Skaradzinski |
| 8,448,989 B2 | | 5/2013 | Verhaeghe |
| 8,474,171 B1 | | 7/2013 | Ludwick |
| 8,696,048 B2 | | 4/2014 | Griffin et al. |
| 8,757,704 B2 | | 6/2014 | Zhao et al. |
| 8,814,255 B2 | | 8/2014 | Yamaji et al. |
| 8,876,193 B2 | | 11/2014 | Kunkel et al. |
| 8,950,144 B2 | | 2/2015 | Padmanabhan |
| 9,051,014 B2 | | 6/2015 | Lookebill et al. |
| 9,138,943 B2 | | 9/2015 | Weinberg |
| 9,138,974 B2 | | 9/2015 | Weinberg |
| 9,138,975 B2 | | 9/2015 | Weinberg |
| 9,174,656 B2 | | 11/2015 | Heitmeyer |
| 9,199,440 B2 | | 12/2015 | Weinberg |
| 9,205,635 B2 | | 12/2015 | Weinberg |
| 9,260,117 B2 | | 2/2016 | Vande Sands |
| 9,339,987 B2 | | 5/2016 | Weinberg |
| 9,371,468 B2 | | 6/2016 | Lewit |
| 9,409,607 B2 | | 8/2016 | Osten |
| 9,434,421 B1 | | 9/2016 | Lu |
| 9,499,203 B1 | | 11/2016 | Finley |
| 9,566,769 B2 | | 2/2017 | Weinberg |
| 9,604,677 B2 | | 3/2017 | McKinney |
| 9,650,003 B2 | | 5/2017 | Owens |
| 9,708,009 B2 | | 7/2017 | Vance |
| 9,738,050 B2 | | 8/2017 | Lee |
| 9,744,753 B2 | | 8/2017 | Sheffield |
| 9,815,501 B2 | | 11/2017 | McCormack |
| 9,827,750 B2 | | 11/2017 | Lookebill |
| 9,828,164 B2 | | 11/2017 | Denson |
| 9,878,744 B2 | | 1/2018 | Lu |
| 9,884,660 B2 | | 2/2018 | Fenton |
| 9,884,661 B2 | | 2/2018 | Fenton |
| 9,889,637 B2 | | 2/2018 | Weinberg |
| 2001/0011832 A1 | | 8/2001 | Ehrlich |
| 2005/0194381 A1 | | 9/2005 | Zupancich |
| 2005/0241253 A1 | | 11/2005 | Song et al. |
| 2006/0021541 A1 | * | 2/2006 | Siebers ................. B62D 21/12 105/1.4 |

(56) References Cited

U.S. PATENT DOCUMENTS

| | | | |
|---|---|---|---|
| 2006/0065152 A1 | 3/2006 | Heitmeyer | |
| 2006/0108361 A1 | 5/2006 | Seiter | |
| 2006/0121244 A1 | 6/2006 | Godwin | |
| 2006/0123725 A1 | 6/2006 | Godwin | |
| 2006/0158005 A1 | 7/2006 | Brown | |
| 2006/0179733 A1 | 8/2006 | Padmanabhan | |
| 2006/0201081 A1 | 9/2006 | Godwin | |
| 2006/0219129 A1 | 10/2006 | Jarvis | |
| 2007/0119850 A1 | 5/2007 | Seiter | |
| 2007/0132278 A1 | 6/2007 | Lester et al. | |
| 2007/0160793 A1 | 7/2007 | Cageao | |
| 2007/0194602 A1 | 8/2007 | Ehrlich | |
| 2007/0216197 A1 | 9/2007 | Wuerfel, III | |
| 2007/0250025 A1 | 10/2007 | Sams | |
| 2008/0290057 A1 | 11/2008 | Zupancich | |
| 2009/0126600 A1 | 5/2009 | Zupancich | |
| 2009/0278386 A1 | 11/2009 | Ehrlich | |
| 2010/0101876 A1 | 4/2010 | Misencik | |
| 2010/0109309 A1 | 5/2010 | Kootstra | |
| 2010/0270819 A1* | 10/2010 | Gustafsson | B62D 24/02 296/29 |
| 2011/0095574 A1 | 4/2011 | Brown | |
| 2011/0204611 A1 | 8/2011 | Ziegler | |
| 2013/0207413 A1 | 8/2013 | Lookebill et al. | |
| 2014/0199551 A1 | 7/2014 | Lewit | |
| 2014/0262011 A1 | 9/2014 | Lewit et al. | |
| 2014/0300134 A1 | 10/2014 | Gerst | |
| 2015/0054311 A1 | 2/2015 | Marchesano et al. | |
| 2015/0076861 A1 | 3/2015 | Padmanabhan | |
| 2015/0137560 A1 | 5/2015 | Presiler | |
| 2015/0158532 A1 | 6/2015 | Ayuzawa | |
| 2015/0203160 A1 | 7/2015 | Peterson et al. | |
| 2015/0336618 A1* | 11/2015 | Buratto | B62D 24/00 296/35.2 |
| 2015/0375801 A1* | 12/2015 | Barthelemy | B62D 33/02 296/184.1 |
| 2017/0057561 A1 | 3/2017 | Fenton | |
| 2017/0166263 A1 | 6/2017 | McKinney | |
| 2017/0210317 A1 | 7/2017 | Owens | |
| 2017/0240216 A1 | 8/2017 | Bauer | |
| 2017/0240217 A1 | 8/2017 | Storz | |
| 2017/0241134 A1* | 8/2017 | McCloud | B60P 1/283 |
| 2017/0247063 A1 | 8/2017 | Banerjee | |
| 2017/0282499 A1 | 10/2017 | LaRocco | |
| 2017/0334489 A1 | 11/2017 | Shin | |
| 2018/0037151 A1* | 2/2018 | Bauer | B62D 33/046 |
| 2018/0057059 A1* | 3/2018 | Bauer | B62D 29/045 |
| 2018/0194405 A1* | 7/2018 | Hatke | B62D 24/02 |

FOREIGN PATENT DOCUMENTS

| | | |
|---|---|---|
| CA | 2181750 | 1/1997 |
| CA | 2199584 | 9/1997 |
| CA | 2253308 | 11/1997 |
| CA | 2551863 | 3/1998 |
| CA | 2219312 | 4/1998 |
| CA | 2242467 | 7/1999 |
| CA | 2261384 | 8/1999 |
| CA | 2265405 | 1/2000 |
| CA | 2275848 | 12/2000 |
| CA | 2382578 | 3/2001 |
| CA | 2455957 | 5/2004 |
| CA | 2768878 | 3/2005 |
| CA | 2811134 | 4/2006 |
| CA | 2529762 | 6/2006 |
| CA | 2650992 | 11/2006 |
| CA | 2528558 | 5/2007 |
| CA | 2565510 | 8/2007 |
| CA | 2604282 | 3/2008 |
| CA | 2689745 | 7/2009 |
| CA | 2689746 | 7/2009 |
| CA | 2689747 | 7/2009 |
| CA | 2689748 | 7/2009 |
| CA | 2689749 | 7/2009 |
| CA | 2689751 | 7/2009 |
| CA | 2797778 | 7/2009 |
| CA | 2802907 | 7/2009 |
| CA | 2788047 | 8/2011 |
| CA | 2763094 | 7/2012 |
| CA | 2848174 | 10/2014 |
| CA | 2894059 | 12/2015 |
| CA | 2807710 | 5/2016 |
| CA | 2977131 | 9/2016 |
| CA | 2958805 | 8/2017 |
| CA | 2958838 | 8/2017 |
| CA | 2958839 | 8/2017 |
| DE | 2617169 | 10/2013 |
| EP | 2660119 | 6/2013 |
| JP | 06293233 | 10/1994 |

OTHER PUBLICATIONS

CMS North America Inc. "Transportation: Refrigerated Semi-trailers Trailers & Vans" available online at http:www.cmsna.com13_transportation_refrigerated_semi_trailers_trailers_vans.php on or before Jul. 2, 2014 2 pages.

North American Composites Virtual Engineered Composites (VEC) Article available online at http:www.nacomposites.comdelivering-performancepage.asp?issueid=7&page=cover Fall 2006 4 pages.

Reichard Dr. Ronnal P. "Composites in Theme Parks: From the perspective of a contractor—trouble shooter—enthusiast!" presented at Florida Institute of Technology at least as early as 1999 37 pages.

Lightweight Structures B.V. "ColdFeather: lightweight composite isothermal trailer" available online at http:www.lightweight-structures.comcoldfeather-lightweight-composite-isothermal-trailerindex.html at least as early as Jun. 18, 2015 6 pages.

Expedition Portal "Truck Camper Construction Costs?" available online at http:www.expeditionportal.comforumthreads12486-Truck-Camper-Construction-Costs at least as early as Jun. 18, 2015 5 pages.

Griffiths Bob "Rudder Gets New Twist with Composites" CompositesWorld posted Aug. 1, 2006 4 pages.

Morey Bruce "Advanced Technologies Supplement: Processes Reduce Composite Costs" Advanced Manufacturing posted Apr. 1, 2007 7 pages.

NetCompositesNow.com "Twisted Composites Rudders" available online at http:www.netcomposites.comnewstwisted-composites-rudders3202 as early as Aug. 11, 2005 3 pages.

Eric Green Associates.com "Composite Rudders Take Shape for U.S. Navy" available online at http:www.ericgreeneassociates.comimagesComposite_Twisted_Rudder.pdf accessed as early as Jul. 13, 2014 7 pages.

Seaver Mark and Trickey Stephen "Underwater Blast Loading of a Composite Twisted Rudder with FBGS" dated Apr. 14, 2008 19th International Conference on Optical Fibre Sensors 2 pages.

Scott Bader Group Companies Crystic "Composites Handbook" 100 pages.

Kedward Keith and Whitney James Delaware Composites Design Encyclopedia "Design Studies" vol. 5 1990 preview version available at https:books.google.combooks?id=9-KYOm81MWEC&printsec=frontcover#v=onepage&q&f=false 17 pages.

Zweben Carl Handbook of Materials Selection "Chapter 12: Composite Materials" 2002 preview version available at https:books.google.combooks7id=gWg-rchM700C&printsec=frontcover#v=onepage&q&f=false 47 pages.

Johnson Truck Bodies Blizzard Series brochure accessed as early as Aug. 1, 2014 8 pages.

International Trucking Shows "True Composites Platform Highlight of International Trucking Show" Aug. 1992 1 page.

Composite Twisted Rudder TCC Meeting 2008 handout 32 pages.

Composite Marine Control Surface installed on USS Pioneer (MCM 9) May 1997 13 pages.

TrailerBody Builders "More Emphasis on Less Weight" available at

(56) References Cited

OTHER PUBLICATIONS http:trailer-bodybuilders.comtrailersmore-emphasis-less-weight May 1, 2008 5 pages.

* cited by examiner

MOUNTING BRACKET FOR A TRUCK BODY AND METHOD FOR MOUNTING A COMPOSITE TRUCK BODY TO A CHASSIS

CROSS-REFERENCE TO RELATED APPLICATION

This application claims priority to U.S. Provisional Patent Application Ser. No. 62/444,981, filed Jan. 11, 2017, the disclosure of which is hereby expressly incorporated by reference herein in its entirety.

FIELD OF THE DISCLOSURE

The present disclosure relates generally to a mounting bracket for coupling a composite floor of a cargo vehicle to a chassis of the cargo vehicle.

BACKGROUND

Straight trucks generally include a single frame, or chassis, on which all axles, the tractor cab, and the truck body are mounted. For example, a floor assembly of the truck body is mounted onto main rails of the chassis, which extend the length of the chassis. Conventional steel truck bodies include a floor assembly with steel beams extending a length of the truck body, steel cross-members above the steel rails, and a floor that rests on the steel cross-members. To mount the truck body onto the chassis, each steel beam is positioned over a main rail of the chassis, a mounting plate is placed above the steel rail and below the main rail, and the mounting plates are connected (e.g., by rods and fasteners) to sandwich together the steel beam and the main rail.

Composite truck bodies, on the other hand, include a one-piece floor assembly molded to include integral main beams. Because of this integral molded design, mounting plates cannot be placed above the main beams to couple the truck body to main rails of a chassis. As a result, mounting brackets are coupled to the main beams (e.g., via an adhesive), and the mounting brackets are then connected to mounting plates positioned below the main rails.

Composite truck bodies may provide advantages over steel truck bodies, such as lighter weight (equating to more load capacity), better insulation, more shock absorption, and corrosion resistance. However, composite truck bodies may suffer from a weaker coupling between the composite floor assembly and a chassis, as compared to steel truck bodies. In particular, heavy loads, large translational forces (such as the truck body striking a bridge), or general wear and tear may cause the adhesive bond between the mounting bracket and the main beam to fail, uncoupling the truck body from the chassis.

SUMMARY

The present disclosure may comprise one or more of the following features and combinations thereof.

According to an embodiment of the present disclosure, a connector assembly is provided to couple a beam of a composite floor to a rail of a chassis. The connector assembly includes: a first side plate having a first hole, the first side plate configured to couple to a first side of the beam; a second side plate having a second hole, the second side plate configured to couple to a second side of the beam; a bar configured to extend horizontally through the first hole in the first side plate, through a beam hole in the beam, and through the second hole in the second side plate; a mounting plate configured to couple to the rail; and at least one rod configured to couple the bar to the mounting plate.

According to another embodiment of the present disclosure, a truck is provided including: a truck body having a composite floor assembly with a beam, the beam having a first side, a second side, and a beam hole that extends from the first side to the second side; a chassis having a rail; and at least one connector assembly coupling the beam to the rail. The at least one connector assembly includes: a first side plate coupled to the first side of the beam, the first side plate having a first hole positioned in communication with the beam hole; a second side plate coupled to the second side of the beam, the second side plate having a second hole positioned in communication with the beam hole; a bar extending horizontally through the first hole in the first side plate, through the beam hole in the beam, and through the second hole in the second side plate; a mounting plate coupled to the rail; and at least one rod coupling the bar to the mounting plate.

According to yet another embodiment of the present disclosure, a method is provided for coupling a beam of a composite floor to a rail of a chassis. The method includes: coupling a first side plate having a first hole to a first side of the beam; coupling a second side plate having a second hole to a second side of the beam; positioning a bar through the first hole in the first side plate, through a beam hole in the beam, and through the second hole in the second side plate; coupling the bar to the rail.

According to yet another embodiment of the present disclosure, a method for coupling a mounting bracket to a beam of a composite floor assembly of a truck body is provided. The method includes positioning side plates on first and second sides of the beam, where each of the side plates include a hole therethrough, and drilling a main beam hole through the beam so that the main beam hole aligns with the hole of each side plate. The method also includes bonding the side plates to the first side and the second side of the beam, routing a tube through the main beam hole and the hole of each of the side plates, and routing a bar through the tube.

According to yet another embodiment, a mounting bracket configured to mount a composite truck body to a chassis is provided. The mounting bracket includes a first side plate having a first hole therethrough and configured to be coupled to a first side of a main beam of the composite truck body and a second side plate having a second hole therethrough and configured to be coupled to a second, opposite side of the main beam and aligned opposite the first side plate. The mounting bracket also includes a tube configured to be routed through the first hole of the first side plate, a main beam hole of the main beam, and the second hole of the second side plate, and a bar configured to be routed through the tube. The bar includes a vertical hole through each end, and each vertical hole is configured to receive a mounting rod.

According to yet another embodiment, a method for mounting a composite truck body to a chassis is provided. The method includes coupling a mounting bracket to a main beam of the truck body and positioning the main beam on a top side of a rail of the chassis. The method also includes fastening a first end of a vertical rod to either end of the mounting bracket, where each vertical rod extends past a bottom side of the rail, and coupling a mounting plate to a second end of both of the vertical rods so that the mounting plate abuts the bottom side of the rail.

These and other features of the present disclosure will become more apparent from the following description of the illustrative embodiments.

DETAILED DESCRIPTION

Figure 1:
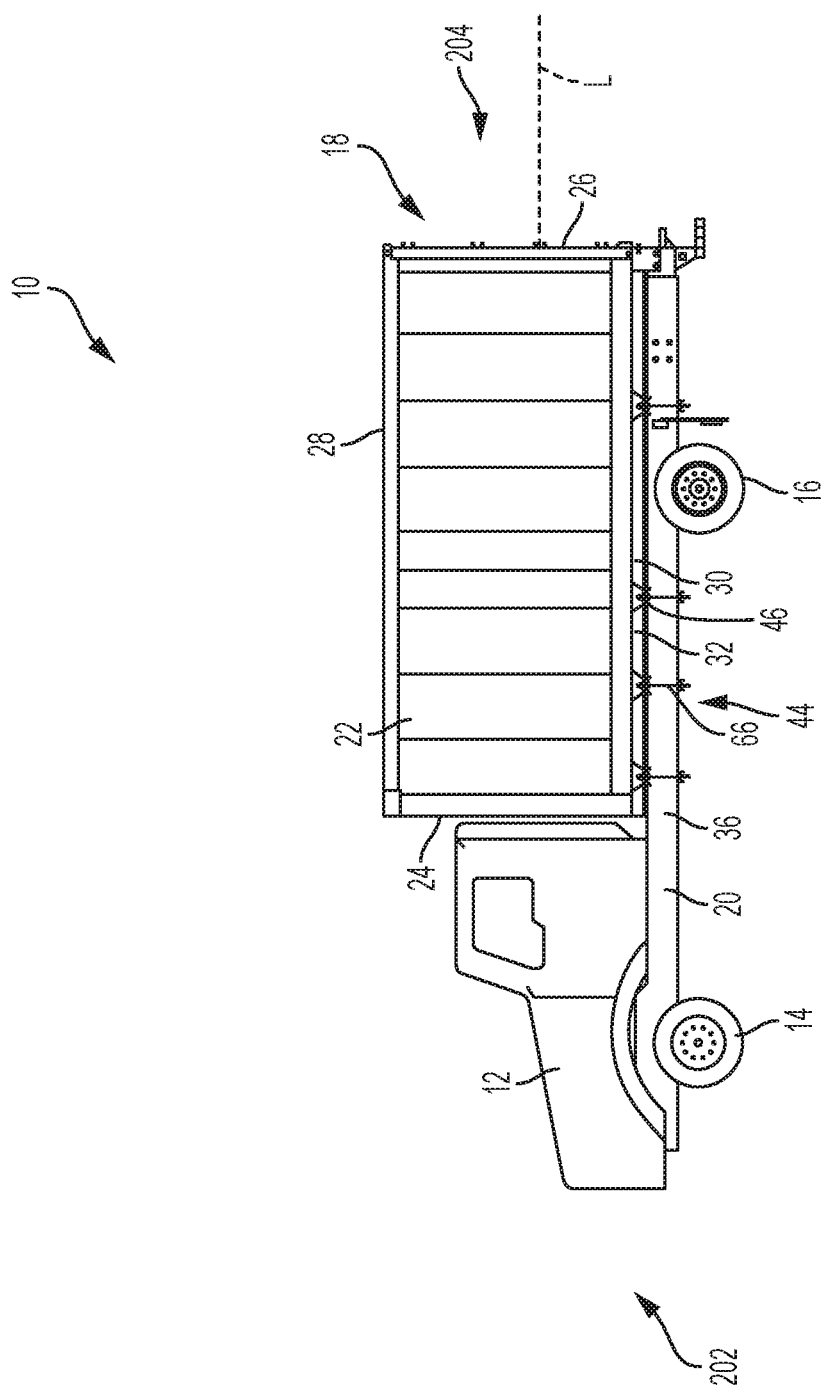
FIG. 1 is a side elevational view of a truck including a truck body mounted to a chassis using an exemplary mounting bracket of the present disclosure.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

For the purposes of promoting an understanding of the principles of the invention, reference will now be made to a number of illustrative embodiments shown in the attached drawings and specific language will be used to describe the same. While the concepts of this disclosure are described in relation to a box-type trailers, it will be understood that that they are equally applicable to other trailers generally, such as pup trailers or tractor-trailers. Accordingly, those skilled in the art will appreciate that the present invention may be implemented in a number of different applications and embodiments and is not specifically limited in its application to the particular embodiments depicted herein.

1. Cargo Vehicle

FIG. 1 illustrates a cargo vehicle, specifically a truck 10, for supporting and transporting various articles or goods. The illustrative truck 10 extends along a longitudinal axis L from a front end 200 to a rear end 202 and includes a motorized cab 12, a front wheel assembly 14, a rear wheel assembly 16, and a cargo or truck body 18. The truck 10 may be a box or van type trailer, in which the cab 12, the front wheel assembly 14, the rear wheel assembly 16, and the truck body 18 are mounted on a single chassis 20. Examples of such a trailer include, but are not limited to, a straight truck, box truck, cube truck, cube van, box van, conventional flat-bed type trailer, small personal trailer and/or commercial trailer.

The truck body 18 includes side walls 22, a front wall 24, a rear wall or door assembly 26, a roof 28, and a floor assembly 30 defining an inside storage portion (not shown) able to store various articles or goods therein. In the illustrated embodiment of FIG. 1, the truck body 18 is an enclosed body that is supported atop the chassis 20. The truck body 18 may be refrigerated and/or insulated to transport temperature-sensitive cargo, but the construction and configuration of the truck body 18 may vary.

Figure 2:
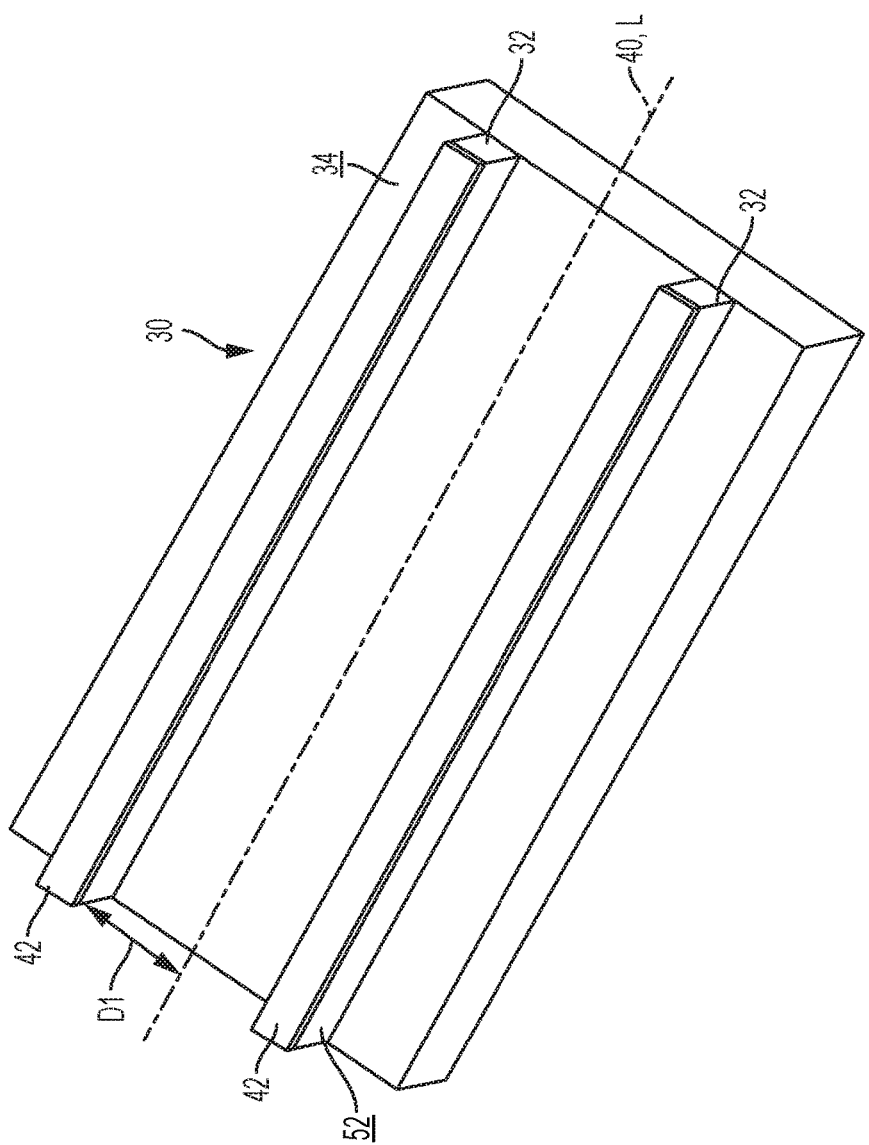
FIG. 2 is an underside, perspective view of a floor assembly of a truck body.

Referring next to FIG. 2, the underside of an exemplary floor assembly 30 of the truck body 18 is shown and includes a platform 31 with an upper surface 33 configured to support various articles or goods and an underside or bottom surface 34. The illustrative floor assembly 30 also includes two longitudinal main beams 32 extending downward from the underside or bottom surface 34 of the platform 31. In certain embodiments, the platform 31 itself is constructed with a plurality transverse beams (not shown) running perpendicular to the main beams 32. Additional information regarding the construction of the floor assembly 30 may be found in U.S. Patent Application Publication No. 2017/0241134, which is incorporated by reference in its entirety herein.

Figure 3:
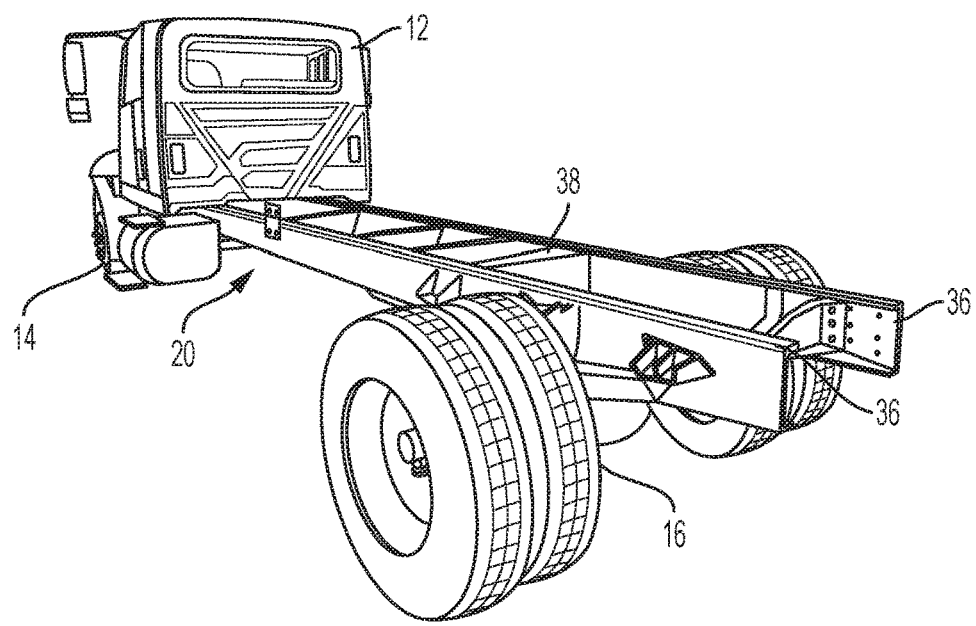
FIG. 3 is a rear perspective view of the truck of FIG. 1 without the truck body mounted on the chassis.

Referring next to FIG. 3, the chassis 20 includes two steel longitudinal main rails 36 connected by suitable transverse couplings 38. Generally, to mount the truck body 18 onto the chassis 20, the truck body 18 is positioned on the chassis 20 so that the main beams 32 of the floor assembly 30 rest on the main rails 36 of the chassis 20, as shown in FIG. 1. As such, the main beams 32 may be sized and spaced apart to correspond to the main rails 36. For example, in one embodiment, the main beams 32 are each spaced a distance D1 of about 42 inches from a center line 40 (which corresponds with longitudinal axis L) of the floor assembly 30, as shown in FIG. 2. Additionally, each main beam 32 may include a wood beam 42 coupled to an underside thereof. The wood beam 42 generally serves as a cushion and a wear plate between the main beam 32 and the main rail 36, as heavy loads inside the truck body 18 can cause the main beam 32 to compress against the main rail 36.

2. Composite Materials

The truck body 18 may be constructed, at least in part, of composite materials. For example, the side walls 22, the front wall 24, the roof 28, and/or the floor assembly 30 of the truck body 18 may be constructed of composite materials. As such, the truck body 18, as well as the side walls 22, the front wall 24, the roof 28, and/or the floor assembly 30 of the truck body 18, may be referred to herein as composite structures. In particular, at least the floor assembly 30 of the truck body 18 may be made of composite materials.

These composite structures of the truck body 18 may lack internal metal components. Also, each composite structure may be a single, unitary or one-piece molded component. Alternatively, each composite structure may comprise multiple pieces of composite material molded or otherwise coupled together. Other elements of the truck body 18 (e.g., the rear frame and door assembly) may be constructed of non-composite (e.g., metallic) materials.

The composite construction of the truck body 18 may present certain advantages. First, because the composite structures may lack internal metal components, the composite truck body 18 may have a reduced heat loss coefficient (Ua) and improved thermal efficiency. Also, the composite truck body 18 may operate to minimize outgassing of blowing agents, minimize air loss, and minimize water intrusion. Additionally, the composite truck body 18 may be lighter in weight than a typical metallic cargo body, which may improve fuel efficiency. Further, the composite truck body 18 may have fewer metallic structures than a typical cargo body, which may make the truck body 18 less susceptible to corrosion. Also, the composite truck body 18 may include fewer parts than a typical metallic cargo body, which may simplify construction, reduce inventory, and reduce variation in manufacturing. Further, the composite truck body 18 may be suitable for use with sensitive cargo, including foodstuffs, because the composite materials may be inert to avoid reacting with the cargo and other materials and because the composite materials may be easy to clean and maintain to ensure proper hygiene. As a result, the composite truck body 18 may qualify as "food grade" equipment.

Composite materials are generally formed by combining two or more different constituents that remain separate and distinct in the final composite material. Exemplary composite materials include fiber-reinforced plastics (FRP), for example carbon-fiber-reinforced plastics (CRP).

The composite structures of the present disclosure may contain one or more structural supports or preforms. The preform may have a structural core that has been covered with an outer fabric layer or skin. The outer skin may be stitched or otherwise coupled to the underlying core and/or any surrounding layers. The core may be extruded, pultruded, or otherwise formed into a desired shape and cut to a desired length. In an exemplary embodiment, the core is a polyurethane foam material or another foam material, and the outer skin is a non-woven spun bond polyester material, a fiberglass fabric, or another suitable material. Advantageously, in addition to its structural effect, the foam core may have an insulating effect in certain applications, including refrigerated trucking applications. Exemplary preforms include PRISMA® preforms provided by Compsys, Inc. of Melbourne, Fla.

Both the core and the outer skin of the preform may be selected to accommodate the needs of the particular application. For example, in areas of the final structure requiring more strength and/or insulation, a low-density foam may be replaced with a high-density foam or a hard plastic block. The individual preforms may also be sized, shaped, and arranged in a manner that accommodates the needs of the particular application. For example, in areas of the final structure requiring less strength, the preforms may be relatively large in size, with the foam cores spanning relatively large distances before reaching the surrounding outer skins. By contrast, in areas of the final structure requiring more strength, the preforms may be relatively small in size, with the foam cores spanning relatively small distances before reaching the surrounding outer skins. Stated differently, the preforms may be shaped as relatively wide panels in areas of the final structure requiring less strength and as relatively narrow support beams in areas of the final structure requiring more strength.

The composite structures of the present disclosure may also contain one or more reinforcing materials or layers around the preforms. Each reinforcing layer may contain reinforcing fibers and may be capable of being impregnated and/or coated with a resin. Suitable fibers include carbon fibers, glass fibers, cellulose, or polymers, for example. The fibers may be present in fabric form, which may be mat, woven, non-woven, or chopped, for example. Exemplary reinforcing layers include chopped fiber fabrics, such as chopped strand mats (CSM), and continuous fiber fabrics, such as 0°/90° fiberglass fabrics, +45°/−45° fiberglass fabrics, +60°/−60° fiberglass fabrics, 0° warp unidirectional fiberglass fabrics, and other stitched fiber fabrics, for example. Such fabrics are commercially available from Vectorply Corporation of Phenix City, Ala. Exemplary fabrics include the E-LM 1810 fiberglass fabric with 0° unidirectional fibers, the E-LTM 3610 fiberglass fabric with 0°/90° fibers, and the E-LTM 2408 fiberglass fabric with 0°/90° fibers, for example.

According to an exemplary embodiment of the present disclosure, a plurality of different reinforcing layers may be stacked together and used in combination. For example, a chopped fiber fabric (e.g., CSM) may be positioned adjacent to a continuous fiber fabric. In this stacked arrangement, the chopped fibers may help support and maintain the adjacent continuous fibers in place, especially around corners or other transitions. Also, the chopped fibers may serve as a web to resist column-type loads in compression, while the adjacent continuous fibers may resist flange-type loads in compression. Adjacent reinforcing layers may be stitched or otherwise coupled together to simplify manufacturing, to ensure proper placement, and to prevent shifting and/or bunching.

To manufacture the composite structures of the present disclosure, the preforms may be cut to size, combined in a mold resembling the final shape with the desired reinforcing layers, and wetted with at least one resin and optionally a catalyst to define a single structure during a curing process. In one embodiment, the resin may be a thermoset plastic resin matrix. An exemplary resin is the co-cure resin disclosed in U.S. Pat. No. 9,371,468, which is incorporated by reference in its entirety herein.

After the curing process, a coating may be applied to the inner and/or outer surfaces of the cured preforms. Additionally, metallic or non-metallic sheets or panels may be applied to the inner and/or outer surfaces of the cured preforms, either in place of the coating or with the coating. The metallic sheets or panels may be comprised of stainless steel, aluminum, and/or coated carbon steel, and the non-metallic sheets or panels may be comprised of carbon fiber composites, for example.

The composite structures may be manufactured using technology disclosed in the following patents and published patent applications, each of which is incorporated by reference in its entirety herein: U.S. Pat. Nos. 5,429,066, 5,800,749, 5,664,518, 5,897,818, 6,013,213, 6,004,492, 5,908,591, 6,497,190, 6,911,252, 5,830,308, 6,755,998, 6,496,190, 6,911,252, 6,723,273, 6,869,561, 8,474,871, 6,206,669, 6,543,469, and 9,371,468 and U.S. Patent Application Publication No. 2014/0262011.

3. Adhesive Bonding

Various connections or joints of the composite truck body 18 may be assembled, at least in part, using adhesive bonding. The adhesive may be a structural adhesive that is suitable for load-bearing applications. The adhesive may have a lap shear strength greater than 1 MPa, 10 MPa, or more, for example. Exemplary adhesives include, for example, epoxies, acrylics, urethanes (single and two part), polyurethanes, methyl methacrylates (MMA), cyanoacrylates, anaerobics, phenolics, and/or vinyl acetates. The adhesive may be selected based on the needs of the particular application.

The method used to form an adhesive bond may also vary according to the needs of the particular application. First, the surfaces receiving the adhesive (i.e., adherends) may be pre-treated, such as by abrading the surfaces, applying a primer, and/or cleaning the surfaces with a suitable cleaner (e.g., denatured alcohol). Second, the adhesive may be applied to the surfaces over a predetermined application time (i.e., "open" time) and at a predetermined application temperature. In certain embodiments, the application temperature may be below the glass-transition temperature of the adhesive. Third, pressure may be applied to the surfaces, such as by using clamps, weights, vacuum bags, and/or ratchet straps, for example. Finally, the adhesive may be allowed to solidify. Some adhesives may undergo a chemical reaction in order to solidify, referred to as curing. This curing may occur over a predetermined cure time and at a predetermined cure temperature. In certain embodiments, the adhesive may be heated during curing such that the cure temperature is higher than the application temperature.

Using adhesive bonding to assemble the composite truck body 18 rather than mechanical fasteners may present certain advantages. First, the composite structures may not require holes for mechanical fasteners, so the structural integrity of the composite structures may be maintained. Also, the adhesive bond may be stronger than a connection using mechanical fasteners. In fact, the strength of the adhesive bond may exceed the strength of the composite structures themselves, so the composite structures may delaminate or otherwise fail before the adhesive fails. Further, the elimination of mechanical fasteners may also provide improved aesthetics. Finally, the adhesive may form a seal between the adherends, which may help fill intentional or unintentional spaces between the adherends and insulate the truck body 18.

4. Connectors

Various connections of the composite truck body 18 may be assembled using one or more connectors, which may include brackets, braces, plates, and combinations thereof, for example. The connectors may vary in size and shape. For example, suitable connectors may be L-shaped, C-shaped, T-shaped, pi-shaped, flat, or bent.

The connectors may be constructed of metallic materials (e.g., aluminum, titanium, or steel), polymeric materials, wood, or composite materials. In certain embodiments, the connectors are constructed of materials which are dissimilar from the composite material used to construct the composite truck body 18. The connectors may be fabricated by extrusion, pultrusion, sheet forming and welding, roll forming, and/or casting, for example.

The connectors may be adhesively bonded to composite structures of the truck body 18. For example, the connectors may be adhesively bonded to the composite side walls 22, front wall 24, roof 28, and/or floor assembly 30 of the composite truck body 18. The connectors may be mechanically fastened to non-composite (e.g., metallic) structures of the truck body 18. For example, the connectors may be mechanically fastened to the metallic rear frame of the truck body 18. Suitable mechanical fasteners include bolts, rivets, and screws, for example.

5. Connection Between Composite Floor and Metallic Chassis

Figure 4:
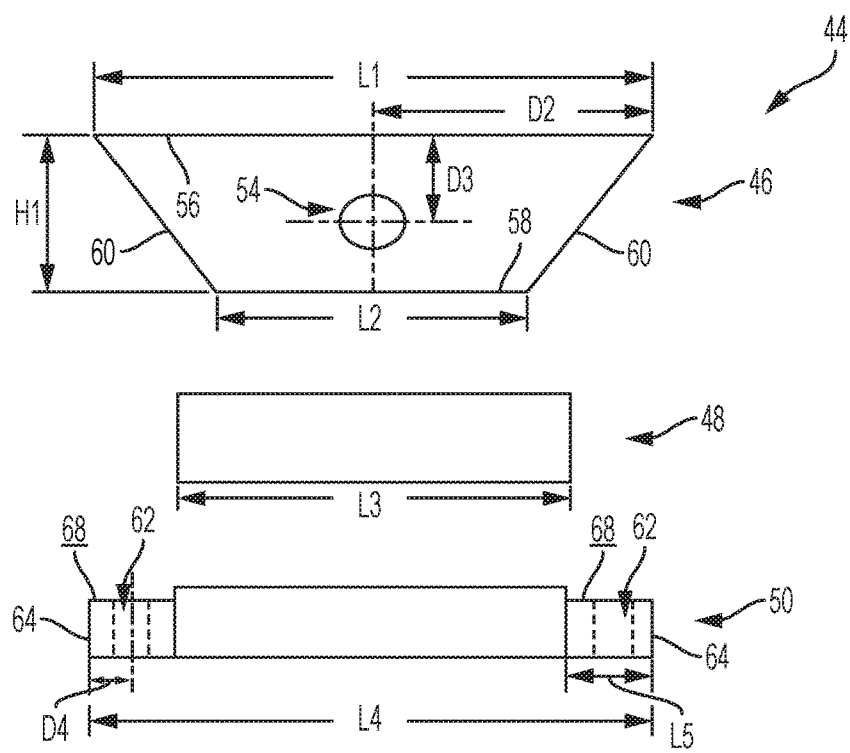
FIG. 4 is a schematic parts view a mounting bracket according to one embodiment of the disclosure.

Once the truck body 18 is positioned onto the chassis 20, one or more connectors or mounting brackets are used to couple the main beams 32 to the main rails 36. According to one embodiment, and as shown in FIG. 4, a mounting bracket 44 may include two side plates 46 (though only one side plate 46 is shown in FIG. 4), a tube 48, and a bar 50. In one embodiment, and as discussed in Section 4 above, each of the components of the mounting bracket 44 may be made of steel. However, other metals may be used in other embodiments.

Figure 7:
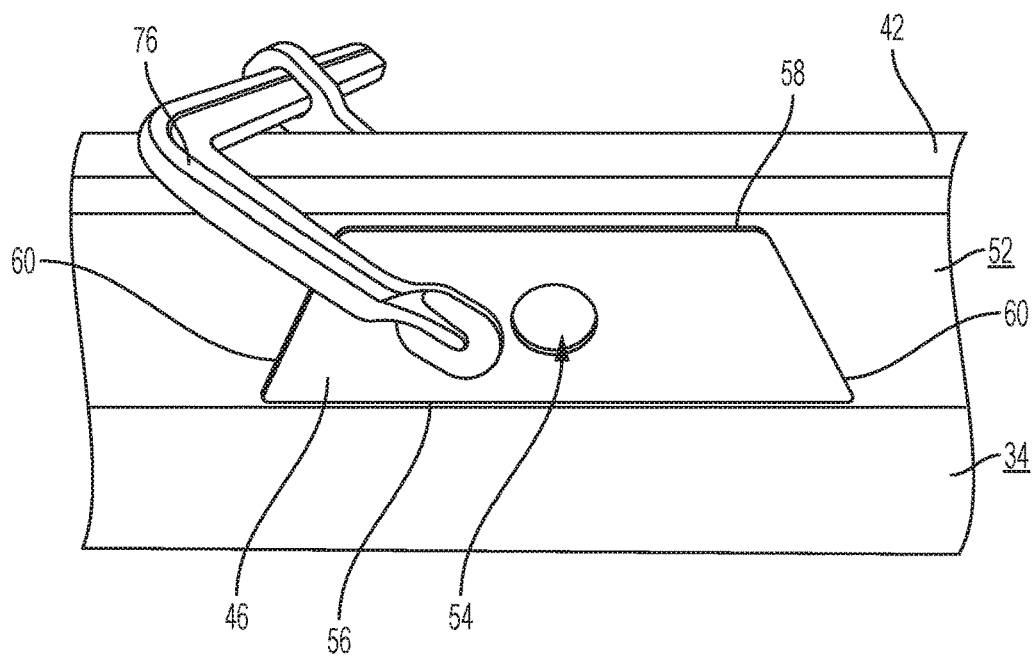
FIG. 7 is a partial top perspective view of the floor assembly of FIG. 6, including side plates of a mounting bracket positioned thereon.
Figure 10:
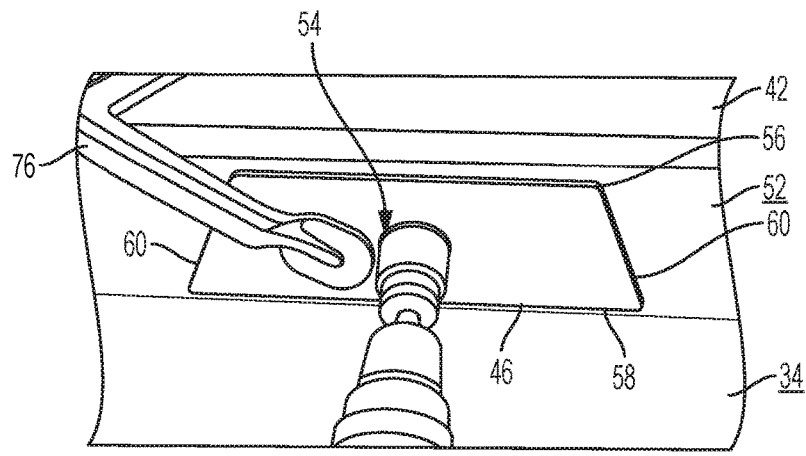
FIG. 10 is a partial top perspective view of the floor assembly of FIG. 6, where a main beam hole is being drilled.
Figure 15:
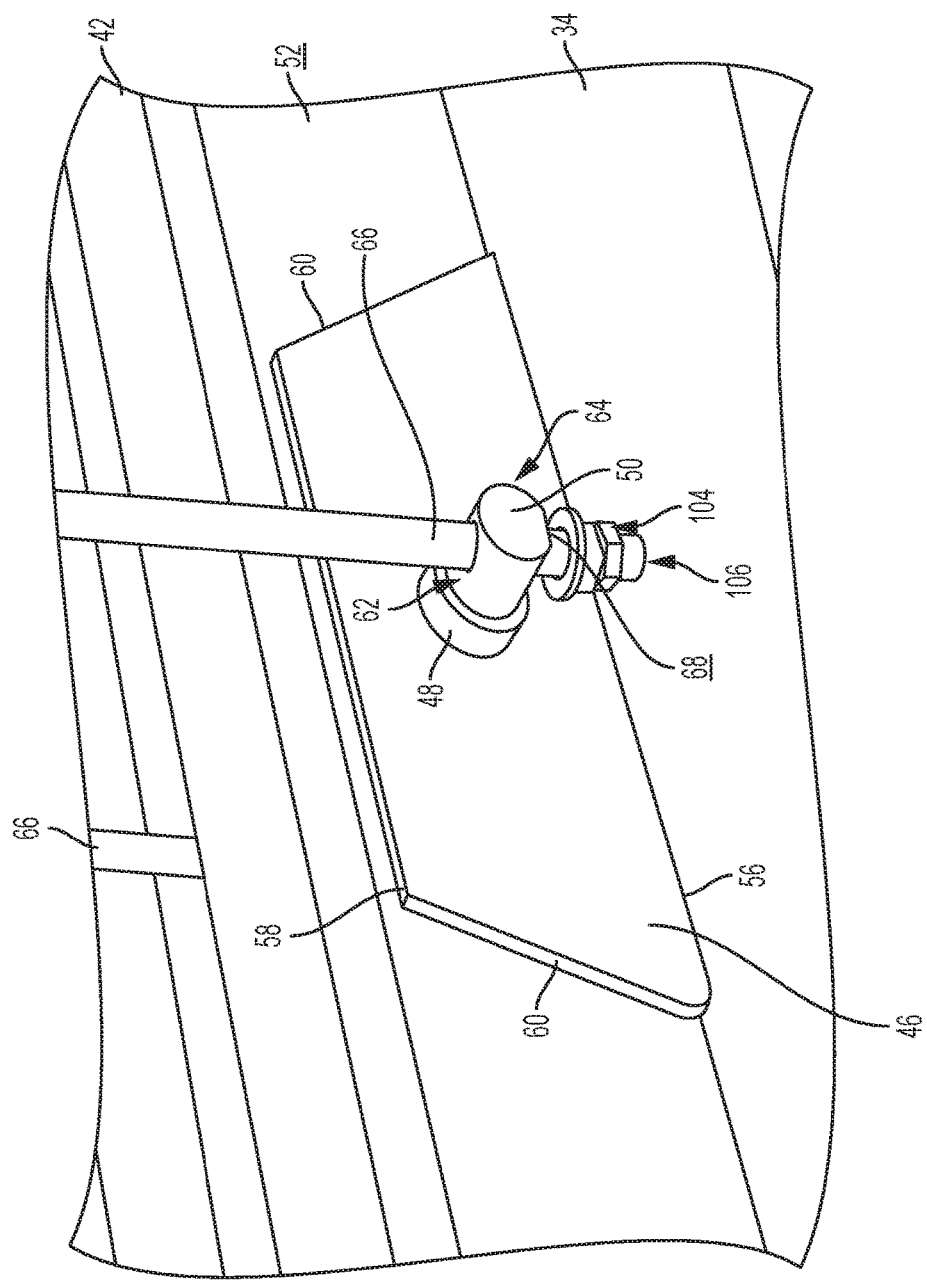
FIG. 15 is a partial side perspective view of the mounting bracket of FIG. 4 coupled to a main beam of a floor assembly.

Generally, the mounting bracket 44 may be sized to be coupled to, and extend through, a composite main beam 32 of floor assembly 30. Illustratively, each side plate 46 can be sized to fit on an opposing side surface 52 of a main beam 32 (as shown in FIGS. 7, 10, and 15) and includes a hole 54 that is sized to receive the tube 48. For example, in one embodiment, each side plate 46 can have a quadrilateral or trapezoidal shape with a top edge 56, a bottom edge 58, and side edges 60 that angle inward from the top edge 56 to the bottom edge 58, as shown in FIG. 4. The top edge 56 may have a length L1 of about 12.75 inches and the bottom edge 58 may have a length L2 of about 9 inches. Each side plate 46 may have a height H1 (e.g., from the top edge 56 to the bottom edge 58) of about 4 inches. The hole 54 may have a diameter of about 1.75 inches and may be positioned in the middle of the side plate 46 with respect to the horizontal (that is, centered at a distance D2 of about 6.37 inches across the top edge 56). The hole 54 may also be positioned below the middle of the side plate 46 with respect to the vertical (that is, centered at a distance D3 of about 2.25 inches below the top edge 56). Each side plate 46 may be made of grade 60k steel and have a thickness of about 0.25 inches. While the side plates 46 are illustrated and described herein as having a trapezoidal shape with specific lengths, heights, and distances, it is within the scope of this disclosure to provide side plates 46 in any number of shapes with different lengths, heights, and distances.

Furthermore, as shown in FIG. 4, the tube 48 may be round and hollow, with an interior hollow diameter sized to receive and support the bar 50. For example, in one embodiment, the tube 48 may be made of 18 gauge steel, having a length L3 of about 6.125 inches, an outer diameter of about 1.66 inches, and an inner diameter (i.e., of the hollow portion) of about 1.39 inches. Additionally, the bar 50 may be substantially round and may be longer than the tube 48 (i.e., a length L4 of the bar 50 may exceed the length L3 of the tube 48), such that the ends 64 of the bar 50 project outward from and are exposed beyond the tube 48. The bar 50 may also include a vertical hole 62 at each exposed end 64 sized to receive a vertical rod 66, as shown in FIG. 15 and further described below. A top side of each end 64 of the bar 50 may be flattened (e.g., machine-flattened) to create a flat surface 68 perpendicular to each vertical hole 62. For example, in one embodiment, the bar 50 may be a solid round steel bar, having a diameter of about 1.25 inches and a total length L4 of about 9 inches. Each flat surface 68 may extend a length L5 about 1.344 inches inward from each end 64 of the bar 50, and the vertical holes 62 may each have a diameter of about 0.6875 inches and may be centered at a distance D4 of about 0.75 inches from each end 64. While the plate 46, the hole 54, the tube 48, and portions of the bar 50 are described as having particular shapes and sizes, the shapes and sizes of the plate 46, the hole 54, the tube 48, and/or portions of the bar 50 may be varied without departing from the scope of the present disclosure.

Figure 5:
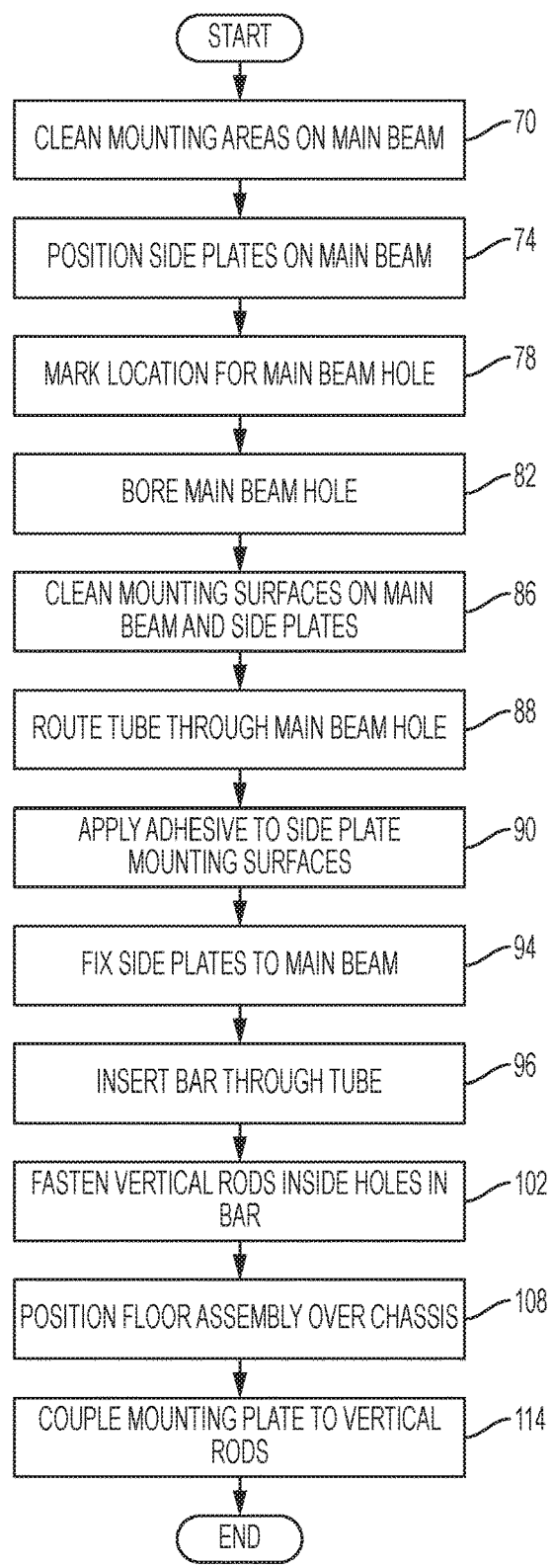
FIG. 5 is a flowchart illustrating a method for coupling a floor assembly of a truck body to a chassis using the mounting bracket of FIG. 4.
Figure 6:
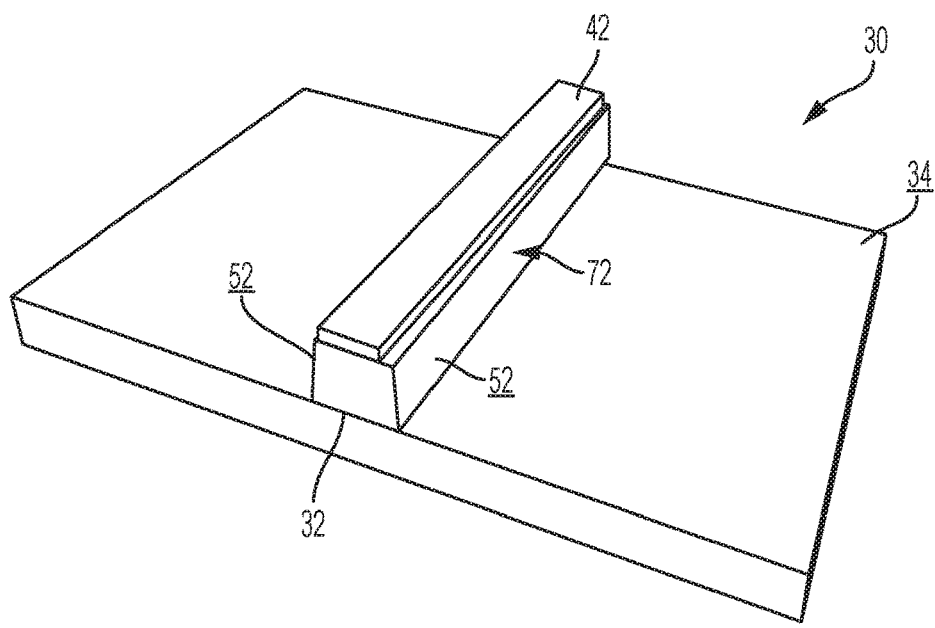
FIG. 6 is a partial rear perspective view of a floor assembly of a truck body.

The mounting bracket 44 may be coupled to a main beam 32 according to the method illustrated in FIG. 5. In particular, at step 70, a mounting area 72 on each side surface 52 of the main beam 32 is cleaned, as discussed in Section 3 above and shown in FIG. 6. Next, at step 74, the side plates 46 are positioned on opposing side surfaces 52 of the main beam 32, as shown in FIG. 7, so that the top edge 56 of each side plate 46 is adjacent the bottom surface 34 and the bottom edge 58 is adjacent the wood beam 42. Also, the side plates 46 are aligned with each other on opposing side surfaces 52 so that their respective holes 54 are aligned.

Figure 8:
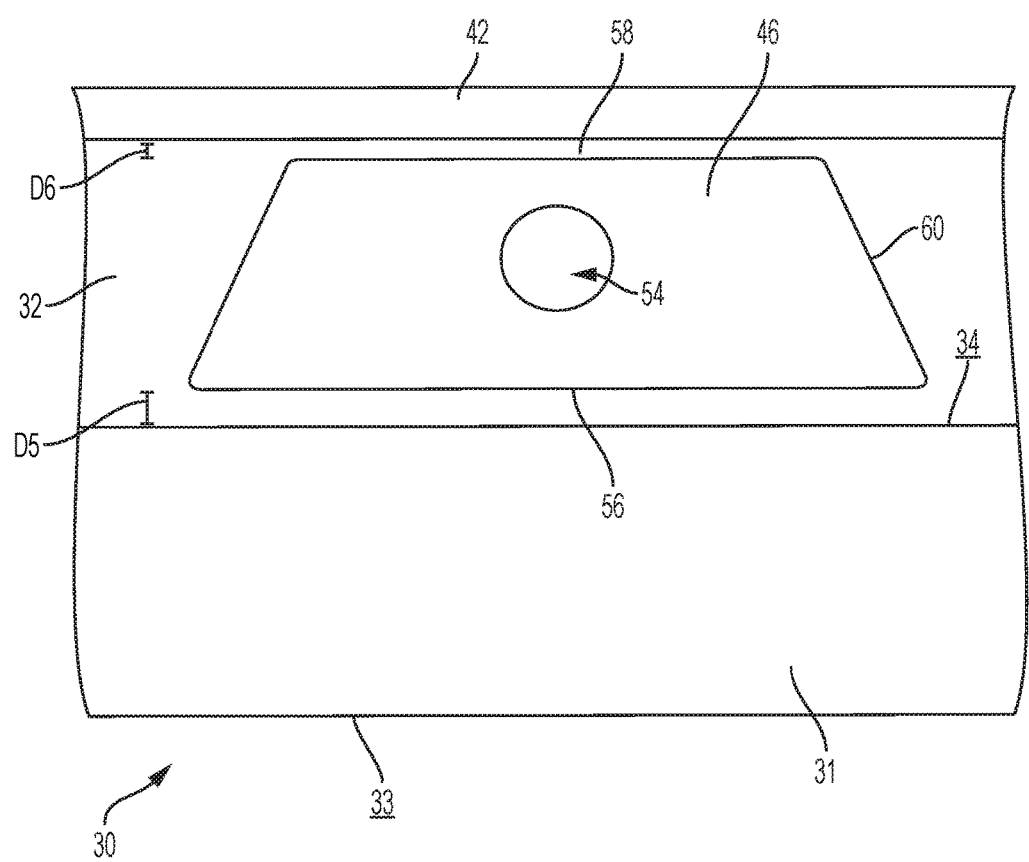
FIG. 8 is an enlarged side view of the floor assembly of FIG. 6, including a side plate spaced apart from a bottom surface of the floor assembly.

Furthermore, and as shown in FIG. 8, the side plates 46 may be shorter in height than the main beam 32 such that the top edges 56 of the side plates 46 may be positioned a distance D5 from the bottom surface 34 of the floor assembly 30 and the bottom edges 58 of the side plates 46 may be positioned a distance D6 from the underside of the main beam 32. The distances D5 and D6 may be sized to provide sufficient clearance to allow for deformation of the floor assembly 30. For example, under heavy loads, the platform 31 of the floor assembly 30 may deform or compress downward (i.e., the bottom surface 34 may compress toward the top edge 56 of the side plate 46). By positioning the side plates 46 the distance D5 away from the bottom surface 34, the platform 31 of the floor assembly 30 can compress (shortening the distance D5) without the side plates 46 cutting into the composite material of the bottom surface 34. Similarly, positioning the side plates 46 the distance D6 away from the underside of the main beam may accommodate compression of the main beam 32. In one embodiment, the distance D5 may be 5/16 inches from the bottom surface 34 and the distance D6 may be about 3/16 inches from the underside of main beam 32. However, other distances may be contemplated in some embodiments, including 0 inches.

Figure 9:
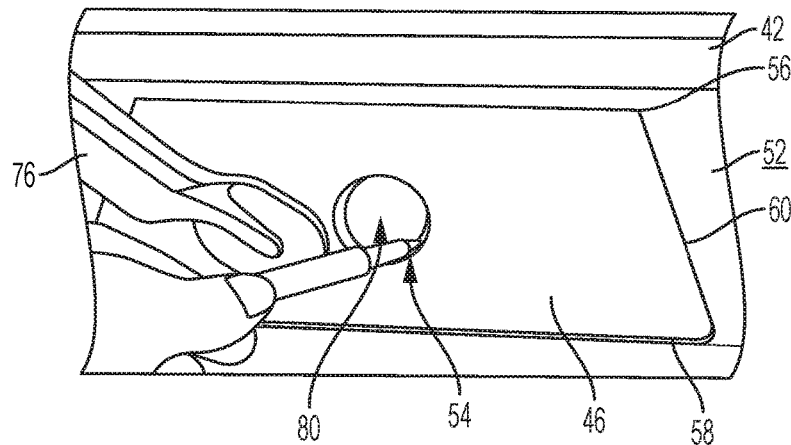
FIG. 9 is a partial top perspective view of the floor assembly of FIG. 6, where a main beam hole is being marked.
Figures 11A, 11B:
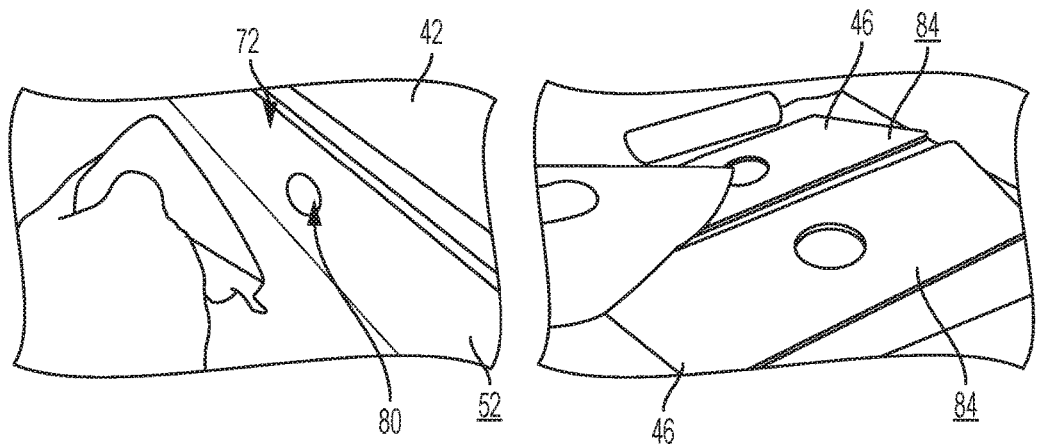
FIG. 11A is a side perspective view of a mounting area of the floor assembly of FIG. 6.
FIG. 11B is a top perspective view of mounting surfaces of side plates of the mounting bracket of FIG. 4.
Figure 12:
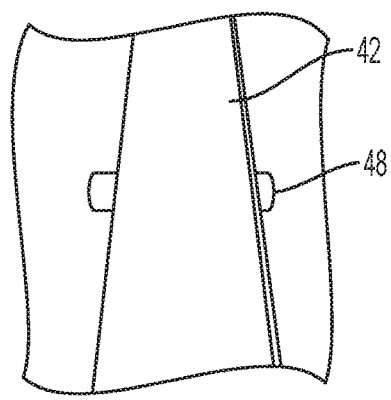
FIG. 12 is a top perspective view of a main beam of the floor assembly of FIG. 6, including a tube routed through a main beam hole.

Once the side plates 46 are positioned at step 74, they may be held in place, for example with a clamp 76, and, at step 78, a location for a main beam hole 80 is marked on the side surfaces 52 to correspond to the holes 54 of the side plates 46, as shown in FIG. 9. The main beam hole 80 is then drilled (e.g., bored) through the composite main beam 32 at step 82, as shown in FIG. 10, with or without the side plates 46 clamped onto the main beam 32. The side plates 46 are then removed (if they were still clamped onto the main beam 32 while the main beam hole 80 was drilled), and the mounting areas 72 on the main beam 32 are again cleaned, as are mounting surfaces 84 of the side plates 46 at step 86, as shown in FIGS. 11A and 11B. The tube 48 is then routed horizontally through the main beam hole 80 at step 88 so that ends of the tube 48 extend outward from each side surface 52 of the composite main beam 32, as shown in FIG. 12. In some embodiments, the tube 48 may fit into the main beam hole 80 in a loose-fit type configuration. In such embodiments, an adhesive may be applied around the tube 48 adjacent the side surfaces 52 (for example, before or after the side plates 46 are bonded to the main beam 32, as described below). The adhesive may act to set the tube's position within the main beam hole 80 and also act as a seal to keep dust, debris, or other elements from entering the main beam hole 80. For example, enough adhesive may be applied around the tube 48 so that the adhesive extrudes out of the main beam hole 80, thus sealing the main beam hole 80 from the above-mentioned elements. In other embodiments, the tube 48 may fit into the main beam hole 80 in a pressure-fit type configuration.

Figure 13:
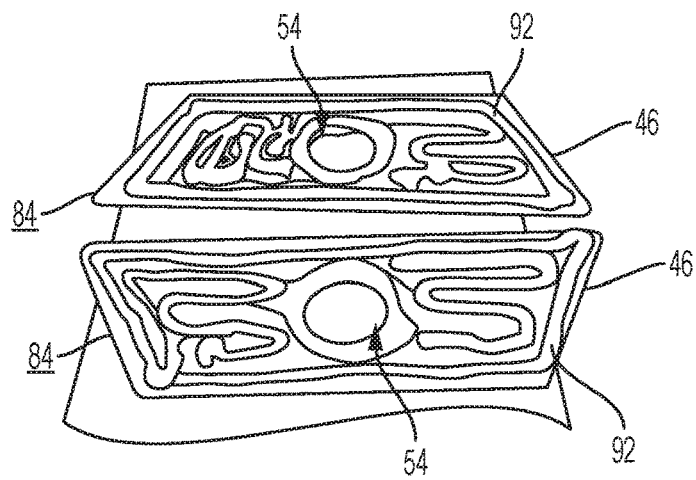
FIG. 13 is a top perspective view of mounting surfaces of side plates of the mounting bracket of FIG. 4, including adhesive thereon.
Figures 14A, 14B:
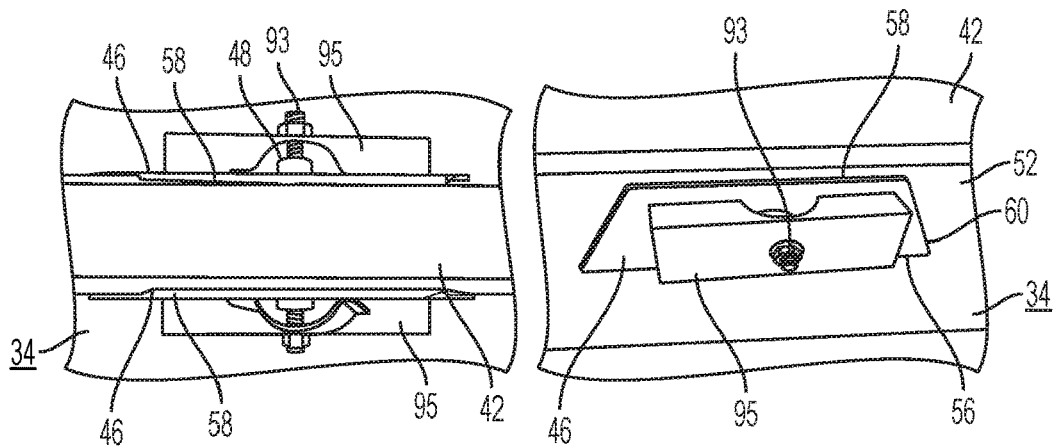
FIG. 14A is a partial top view of a main beam of the floor assembly of FIG. 6, including side plates of the mounting bracket of FIG. 4 mounted thereon.
FIG. 14B is a partial side perspective view of the main beam of FIG. 14A.

At step 90, an adhesive 92 is applied to the mounting surfaces 84 of the side plates 46, as discussed in Section 3 above and shown in FIG. 13. The adhesive 92 may be any type of bonding material, such as Lord T-18 adhesive or other suitable adhesives. At step 94, the side plates 46 are positioned back onto the mounting areas 72 of the main beam 32 and held in place until the adhesive dries, thus coupling the side plates 46 to the main beam 32. The holes 54 in the side plates 46 are positioned to receive the tube 48 and communicate with the drilled hole 80 in the main beam 32. The side plates 46 may be held in place via a bolt or threaded rod 93 routed through the tube 48 and attached to plates 95, as shown in FIGS. 14A and 14B, or conventional clamps may hold the side plates 46 against the mounting areas 72 until the adhesive dries. Also, while an adhesive is described and illustrated herein to couple the side plates 46 to the main beam 32, other types of mechanical fastening methods are contemplated in various embodiments.

Once the side plates 46 are coupled to the main beam 32, at step 96, the bar 50 is routed horizontally through the tube 48 so that each end 64 of the bar 50 extends outward past the ends of the tube 48 and past the side plates 46. As described above, each end 64 of the bar 50 includes a vertical hole 62 configured to receive a vertical mounting rod 66, as shown in FIG. 15 and described further below. In some embodiments, the bar 50 may fit through the tube 48 in a loose-fit type configuration, so that the bar 50 may move freely within the tube 48. In other embodiments, however, the bar 50 may fit through the tube 48 in a pressure-fit type configuration, so that the bar 50 does not move freely within the tube 48. The bar 50 may be positioned within the tube 48 so that the machine-flattened surfaces 68 face the bottom surface 34 of the floor assembly 30.

Once the bar 50 is in place, at step 102, the vertical mounting rods 66 are positioned on opposing sides of the main beam 32 and through the vertical holes 62 in the opposing ends 64 of the bar 50, as shown in FIG. 15. The mounting rods 66 may be held in place by attaching upper fasteners 104 to a first end 106 of each mounting rod 66 (i.e., the end adjacent the bottom surface 34 of the floor assembly 30). The upper fasteners 104 may include a flange nut and a locking nut and/or other suitable fastener(s). The upper fasteners 104 provide an end stop so that, with the floor assembly 30 rotated upright for placement upon the chassis 20 as described further below, the vertical rod 66 cannot slide downward and completely out from the vertical holes 62 of the bar 50. Also, the flat ends 68 of the bar 50 provide a flat surface for the upper fasteners 104 to rest upon, which enables better torque and load resistance at this contact point between the rod 66 and the bar 50 when the main beam 32 is coupled to a main rail 36, as described further below.

The above steps of FIG. 5 may be repeated so that multiple mounting brackets 44 and mounting rods 66 are coupled to each main beam 32 along its length. For example, in some applications and as shown in FIG. 1, six to eight mounting brackets 44 and their associated mounting rods 66 are coupled to the main beams 32 in a spaced-part manner along a length of the floor assembly 30 (e.g., three to four mounting brackets 44 per main beam 32). However, it should be understood that more or fewer mounting brackets 44 may be used as well.

Figure 16:
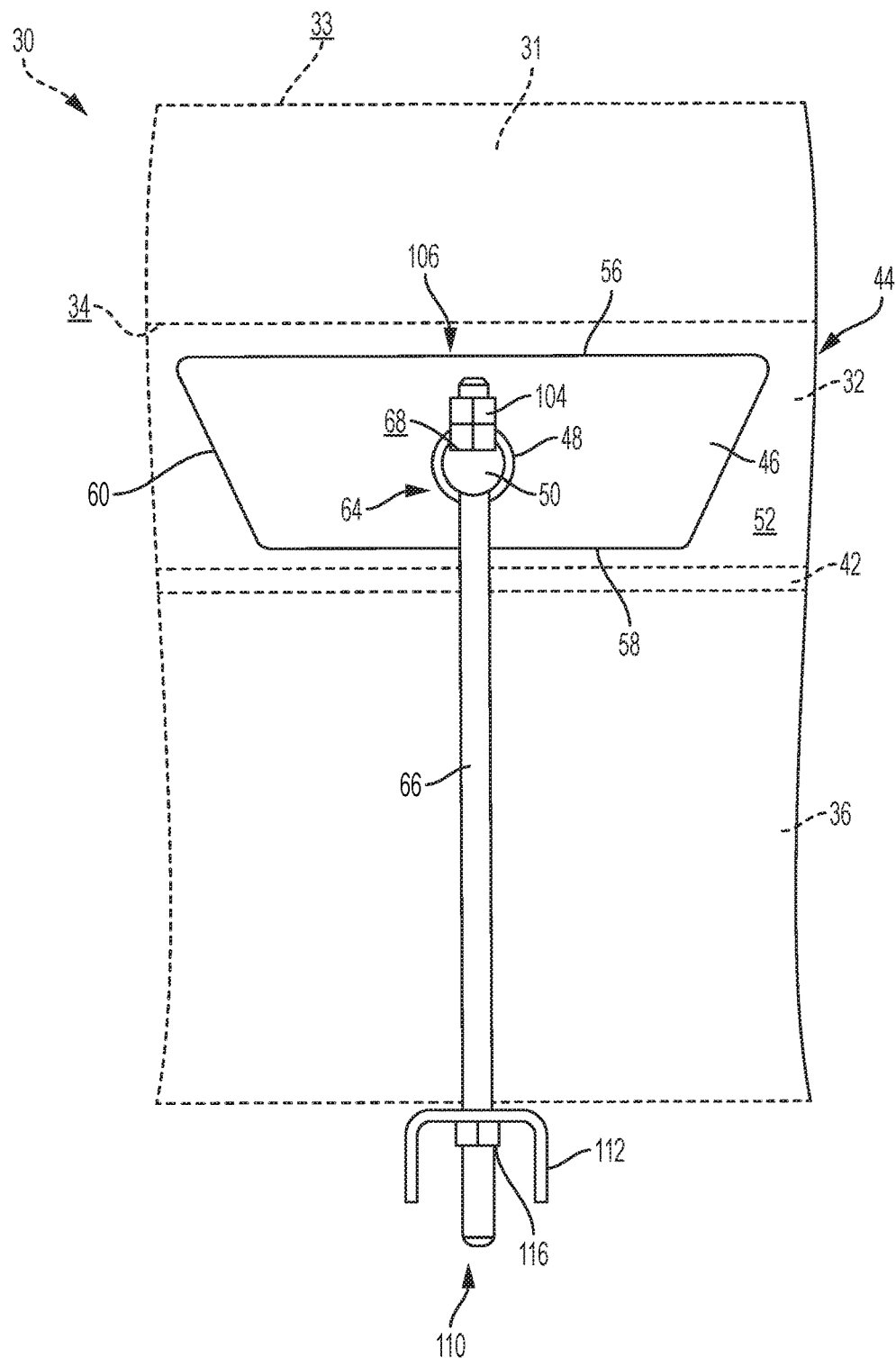
FIG. 16 is a side elevational view of the main beam of the floor assembly of FIG. 15 coupled to a main rail of a chassis via a mounting plate coupled to an underside of the main rail of the chassis and the mounting bracket of FIG. 4 coupled to the main beam of the floor assembly.
Figure 17:
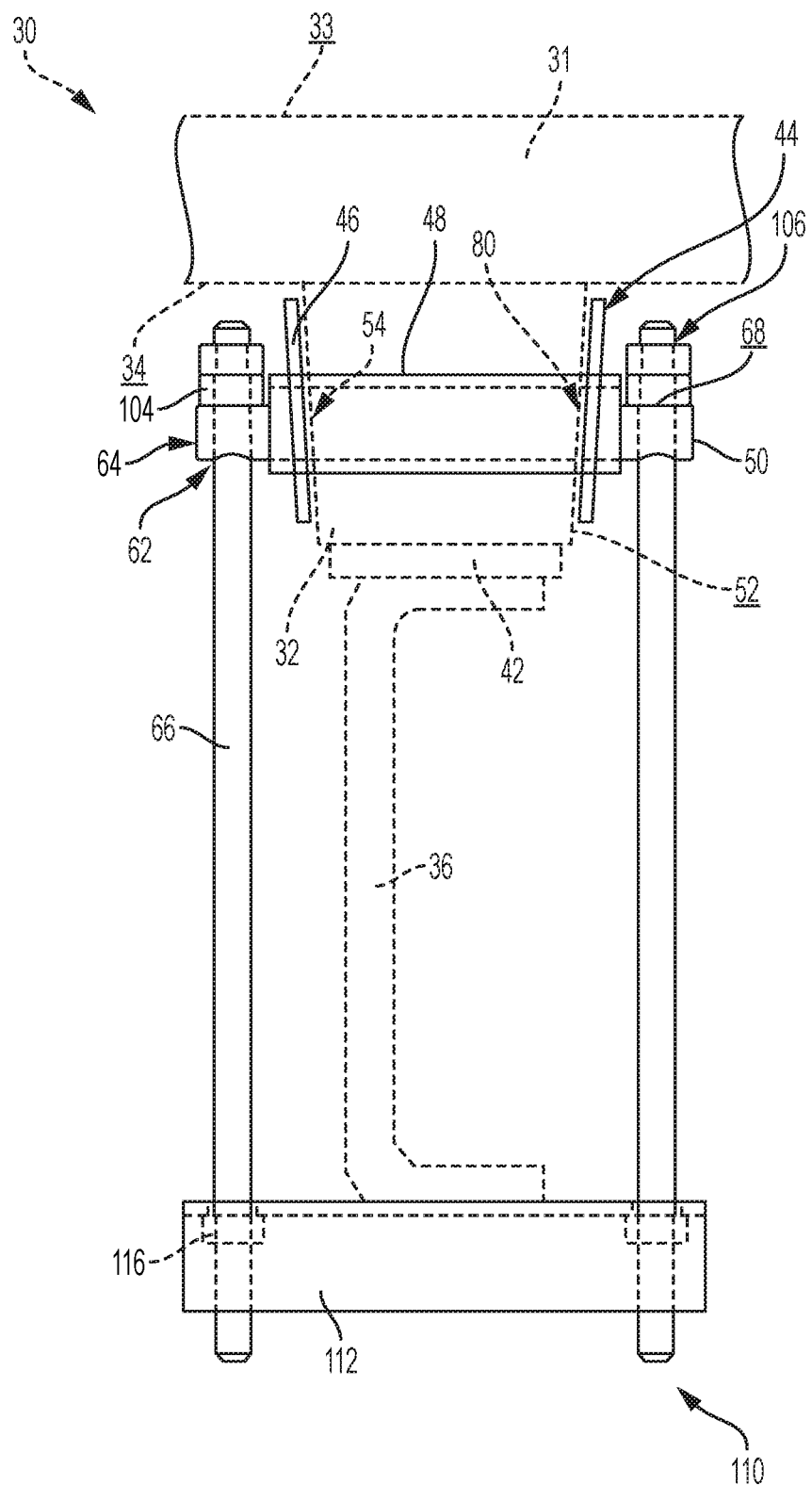
FIG. 17 is a rear elevational view of the main beam of the floor assembly coupled to the main rail of the chassis, as shown in FIG. 16.

Once the mounting brackets 44 are coupled to the main beams 32 and the vertical mounting rods 66 are in place, the main beams 32 of the floor assembly 30 may be coupled to the main rails 36 of the chassis 20. At step 108, the floor assembly 30 is rotated upright and positioned on top of the chassis 20 so that the main beams 32 of the floor assembly 30 align with the main rails 36 of the chassis 20. As shown in FIGS. 16 and 17, each side plate 46 of the mounting bracket 44 may be slightly offset from a vertical orientation to mimic the tapered shape of the composite main beam 32. Also, each vertical rod 66 may be sized so that the first or upper end 106 is generally aligned with the main beam 32 and a second or lower end 110 extends downward past the main beam 32 and the main rail 36 in order to receive a mounting plate 112. Once the floor assembly 30 is positioned atop the chassis 20, at step 114, each mounting plate 112 is positioned across a bottom side of the main rail 36 and is coupled to the second ends 110 of the opposing vertical rods 66 with lower fasteners 116, thereby clamping each mounting plate 112 onto the main rail 36. It is also within the scope of the present disclosure for the mounting plate 112 to be fastened directly to the main rail 36 or otherwise coupled to the main rail 36. As a result, the main rail 36 is clamped or sandwiched between the wood beam 42 (attached to the main beam 32) and the mounting plate 112, thus coupling the main rail 36 to the main beam 32. In this arrangement, the main rail 36 is coupled to the main beam 32 via the mounting bracket 44, the vertical rods 66, the mounting plate 112, the upper fasteners 104, and the lower fasteners 116, which collectively form a connector assembly between the main rail 36 and the main beam 32.

Illustratively, while the above method is shown and described with steps in a specific order, it is within the scope of this disclosure to provide such method with steps in a different order. For example, the floor assembly 30 may positioned on top of the chassis 20 (step 108) before the vertical rods 66 are inserted through the mounting brackets 44 (step 102).

Figure 18:
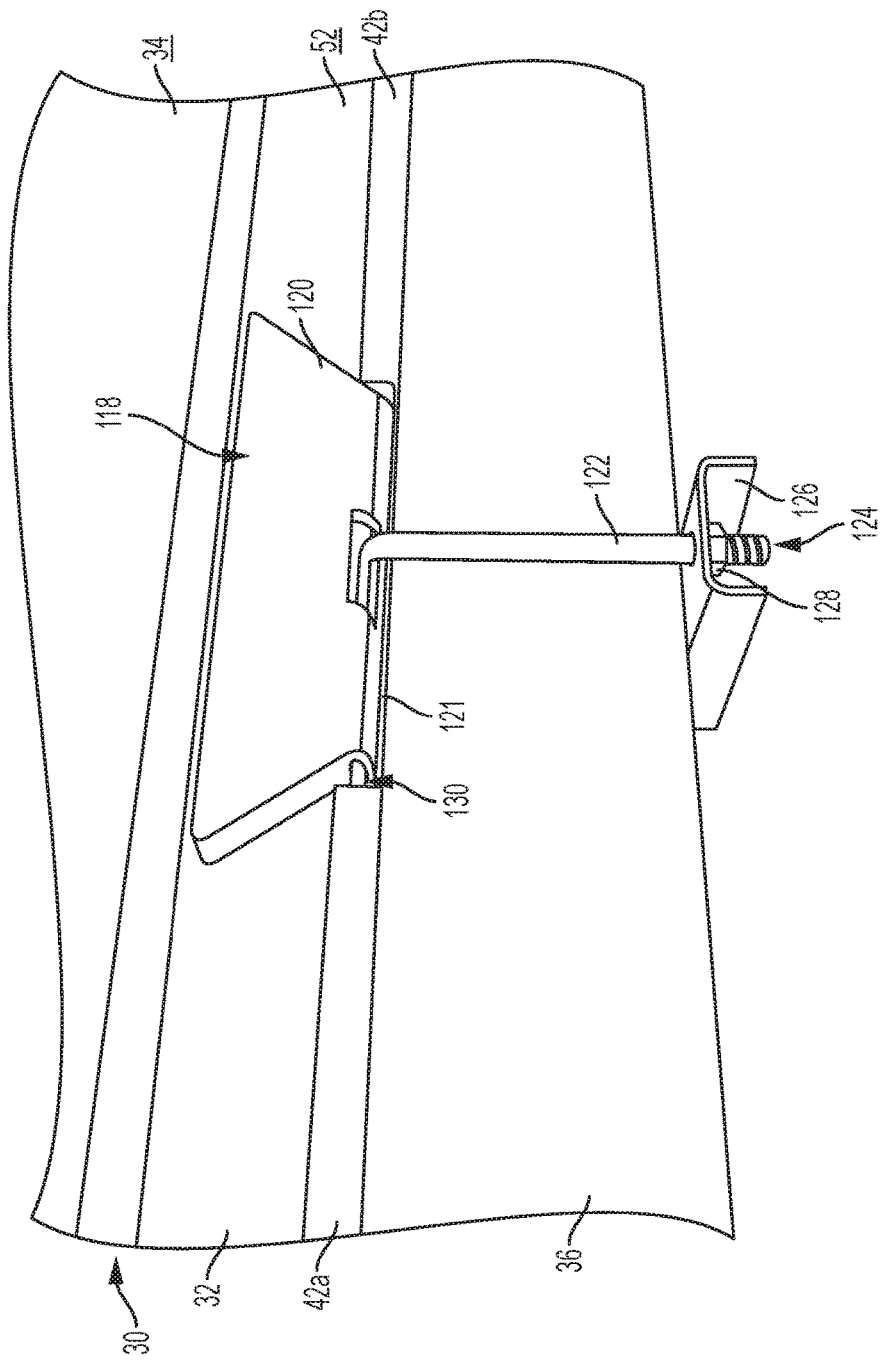
FIG. 18 is a partial underside, perspective view of a prior art mounting bracket coupling a main beam of a floor assembly to a main rail of a chassis.

The mounting bracket 44 of the present disclosure may provide multiple advantages over other mounting brackets such as, but not limited to, permitting easier installation, accommodating heavier loads, and enabling a stronger coupling that is less likely to fail from heavy loads, shear forces, and/or general wear and tear. For example, FIG. 18 illustrates a prior art mounting bracket 118 for mounting a main beam 32 to a main rail 36. This prior art mounting bracket 118 is described further in U.S. patent application Ser. No. 15/686,903, filed Sep. 1, 2017, the disclosure of which is incorporated by reference in its entirety herein.

As shown in FIG. 18, the prior art mounting bracket 118 includes a u-shaped bracket 120 coupled around the sides 52 and underside of the main beam 32. A u-bolt 122 is routed between the main beam 32 and the u-shaped bracket 120 so that the lower vertical ends 124 of the u-bolt 122 extend downward past the main rail 36 when the main beam 32 is positioned on the main rail 36. A mounting plate 126 (like the mounting plate 112 of FIGS. 16 and 17) is coupled to the vertical ends 124 of the u-bolt 122 via fasteners 128 so that the mounting plate 126 abuts the underside of the main rail 36, thus coupling the main beam 32 to the main rail 36.

As shown in FIG. 18, because the u-shaped bracket 120 includes a cross-piece 121 extending along an underside of the main beam 132, the wood beam 42 must be cut into two pieces 42a and 42b to accommodate the mounting bracket 118. Thus, wherever such mounting brackets 118 are located, the u-shaped bracket 120 extends through a beam cut-out 130 between the wood beam pieces 42a and 42b and contacts the main rail 36 (rather than the wood beam 42 contacting the main rail 36). Unlike the mounting bracket 118, the present mounting bracket 44 includes two side plates 46 separately mounted to the side surfaces 52 of the main beam 32, therefore allowing the wood beam 42 to span the entire underside of the main beam 32. Thus, the present configuration allows the wood beam 42 to provide more cushioning between the main beam 32 and the main rail 36 and also removes the step of cutting the wood beam 42 during installation of the mounting bracket 44, therefore potentially making installation easier. The continuous wood beam 42 of the present configuration also eliminates direct contact between the steel side plates 46 and the steel main rail 36, therefore reducing the likelihood of corrosion between these steel components.

Furthermore, with respect to installation, the present mounting bracket 44 may permit easier installation compared to the prior art mounting bracket 118 because the side plates 46 are separately attached to each side 52 of the main beam 32. In particular, the prior art mounting bracket 118 requires two pieces welded together around the u-bolt 122 to create the u-shaped bracket 120. The entire u-shaped bracket 120, with the u-bolt 122, must then be bonded to the main beam 32. Positioning the u-shaped bracket 120 on the main beam 32 may be more difficult than positioning the side plates 46 because, due to the composite material of the floor assembly 30, the mounting surfaces 72 of the main beam 32 may be uneven. On the other hand, the present mounting bracket 44 does not require any pieces welded together and the separate side plates 46 may achieve a better bond with the main beam 32 because they can each conform to the irregularities of a respective side surface 52. Additionally, the present mounting bracket 44 may be coupled to the main beam 32 while the truck body 18 is already positioned on the chassis 20, which cannot be done with the mounting bracket 118 (i.e., because the u-shaped bracket 120 must be mounted to the underside of the main beam 32).

While the separate side plates 46 of the present mounting bracket 44 make it a four-piece design, compared to the two-piece design of the prior art mounting bracket 118, the present mounting bracket 44 may weigh less than the prior art mounting bracket 118. For example, in one embodiment, the present mounting bracket 44 weighs about 10.315 pounds, whereas the mounting bracket 118 weights about 11.455 pounds. By weighing less, the present mounting bracket 44 may enable the truck body 18 to accommodate heavier loads (i.e., because the mounting brackets 44 add less to the total load capacity of the chassis 20).

Additionally, the present mounting bracket 44 itself may accommodate heavier loads, as well as larger shear forces and general wear and tear, than the prior art mounting bracket 118. With the present mounting bracket 44, even if the bond between the side plates 46 and the main beam 32 fails, the tube 48 and the bar 50 still extend through the main beam 32 so that the present mounting bracket 44 cannot detach from the main beam 32. This may provide a stronger coupling because, generally, the main beam 32 will fail (i.e., by detaching from the bottom surface 34 of the floor assembly 30) before the mounting bracket 44 will fail. For example, the mounting bracket 44, coupled to a main beam 32, may be capable of withholding loads in the range of about 10,000 pounds to about 15,000 pounds before the main beam 32 (not the mounting bracket 44) fails and detaches from the floor assembly 30.

While the principles of the present disclosure have been depicted as being utilized with particular structures, the coupling method described herein should not be limited to such structures. More particularly, the principles of the present disclosure may be utilized in conjunction with any composite floor assembly and trailer type.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected. For example, any of the features or functions of any of the embodiments disclosed herein may be incorporated into any of the other embodiments disclosed herein.

I claim:

1. A connector assembly configured to couple a beam of a composite floor to a rail of a chassis, the connector assembly comprising:
    a first side plate having a first hole, the first side plate configured to couple to a first side of the beam;
    a second side plate having a second hole, the second side plate configured to couple to a second side of the beam;
    a bar configured to extend horizontally through the first hole in the first side plate, through a beam hole in the beam, and through the second hole in the second side plate;
    a mounting plate configured to couple to the rail; and
    at least one rod configured to couple the bar to the mounting plate.

2. The connector assembly of claim 1, further comprising a tube configured for placement in the beam hole to support the bar.

3. The connector assembly of claim 2, wherein the bar is longer than the tube such that an end of the bar projects outward from the tube.

4. The connector assembly of claim 3, wherein the at least one rod extends vertically through a hole in the end of the bar.

5. The connector assembly of claim 3, wherein the end of the bar includes a flat surface configured to support a fastener on the at least one rod.

6. The connector assembly of claim 2, wherein the bar is sized to move freely within the tube.

7. The connector assembly of claim 1, wherein the first and second side plates are shorter in height than the beam.

8. The connector assembly of claim 1, wherein the at least one rod includes a first rod positioned on the first side of the beam and a second rod positioned on the second side of the beam.

9. A truck comprising:
    a truck body having a composite floor assembly with a beam, the beam having a first side, a second side, and a beam hole that extends from the first side to the second side;
    a chassis having a rail; and
    at least one connector assembly coupling the beam to the rail, the at least one connector assembly comprising:
        a first side plate coupled to the first side of the beam, the first side plate having a first hole positioned in communication with the beam hole;
        a second side plate coupled to the second side of the beam, the second side plate having a second hole positioned in communication with the beam hole;
        a bar extending horizontally through the first hole in the first side plate, through the beam hole in the beam, and through the second hole in the second side plate;
        a mounting plate coupled to the rail; and
        at least one rod coupling the bar to the mounting plate.

10. The truck of claim 9, further comprising a plurality of connector assemblies spaced apart along a length of the truck.

11. The truck of claim 9, further comprising a wooden beam sandwiched between the beam and the rail.

12. The truck of claim 9, wherein the first and second plates are offset from a vertical orientation to follow a tapered shape of the beam.

13. The truck of claim 9, wherein the mounting plate is clamped against a bottom side of the rail.

14. The truck of claim 9, wherein the composite floor assembly comprises a fiber-reinforced plastic.

15. A method for coupling a beam of a composite floor to a rail of a chassis, the method comprising:
    coupling a first side plate having a first hole to a first side of the beam;
    coupling a second side plate having a second hole to a second side of the beam;
    positioning a bar through the first hole in the first side plate, through a beam hole in the beam, and through the second hole in the second side plate;
    coupling the bar to the rail.

16. The method of claim 15, wherein coupling the first and second plates to the beam comprises adhering the first and second plates to the beam.

17. The method of claim 15, further comprising drilling through the beam to form the beam hole.

18. The method of claim 15, further comprising positioning a tube in the beam hole and inserting the bar through the tube.

19. The method of claim 18, further comprising adhering the tube to the beam.

20. The method of claim 15, wherein coupling the bar to the rail comprises:

positioning a mounting plate beneath the rail; coupling a first vertical rod to the bar and the mounting plate on the first side of the beam and coupling a second vertical rod to the bar and the mounting plate on the second side of the beam.

\* \* \* \* \*